United States Patent
Otosaka (10) Patent No.: US 9,688,564 B2
(45) Date of Patent: Jun. 27, 2017

(54) ELONGATING METHOD AND APPARATUS FOR GLASS BASE MATERIAL

(75) Inventor: Tetsuya Otosaka, Gunma (JP)

(73) Assignee: Shin-Etsu Chemical Co., Ltd., Gunma (JP)

( * ) Notice: Subject to any disclaimer, the term of this patent is extended or adjusted under 35 U.S.C. 154(b) by 781 days.

(21) Appl. No.: 13/409,073

(22) Filed: Feb. 29, 2012

(65) Prior Publication Data

US 2012/0222452 A1    Sep. 6, 2012

(30) Foreign Application Priority Data

Mar. 2, 2011    (JP) .................................. 2011-045214

(51) Int. Cl.
| | |
|---|---|
| *C03B 37/012* | (2006.01) |
| *C03B 23/203* | (2006.01) |
| *C03B 23/047* | (2006.01) |
| *C03B 23/207* | (2006.01) |

(52) U.S. Cl.
CPC ...... *C03B 37/01242* (2013.01); *C03B 23/047* (2013.01); *C03B 23/207* (2013.01); *C03B 37/0126* (2013.01)

(58) Field of Classification Search
CPC .............. C03B 23/047; C03B 23/0126; C03B 37/01242; C03B 37/0126
See application file for complete search history.

(56) References Cited

U.S. PATENT DOCUMENTS

| | | | | |
|---|---|---|---|---|
| 1,806,445 | A | * | 5/1931 | Broche ................. C03B 33/095 225/93.5 |
| 2,992,517 | A | * | 7/1961 | Hicks, Jr. ........................ 65/401 |
| 3,643,848 | A | * | 2/1972 | Haller ..................... C03B 33/06 226/186 |
| 4,310,339 | A | * | 1/1982 | Blankenship ................... 65/416 |

(Continued)

FOREIGN PATENT DOCUMENTS

| | | |
|---|---|---|
| CN | 1705620 A | 12/2005 |
| CN | 1860082 A | 11/2006 |

(Continued)

OTHER PUBLICATIONS

European Patent Office (1993) "English language abstract of JP 5-78139", one page.*

(Continued)

*Primary Examiner* — John Hoffmann (57) ABSTRACT

A method of elongating a glass base material to obtain a glass rod having a smaller diameter, using a glass base material elongating apparatus including a feeder at least for the glass base material, a heating furnace, and an elongating mechanism of the glass base material below the heating furnace, is such that a horizontal plane position measuring unit of the glass base material is provided inside or near the heating furnace, the feeder has a glass base material horizontal plane position adjusting unit, and the elongating mechanism has three or more sets of elongating rollers capable of switching between grasping and releasing for keeping the position of the glass rod in the horizontal plane (Continued)

to be constant, and the glass base material is elongated with the position thereof in the horizontal plane kept as targeted by controlling the glass base material horizontal plane position adjusting unit.

6 Claims, 6 Drawing Sheets

(56) References Cited

U.S. PATENT DOCUMENTS

| | | | | |
|---|---|---|---|---|
| 4,407,667 | A * | 10/1983 | Le Noane et al. | 65/407 |
| 4,506,771 | A * | 3/1985 | Krogh | B23Q 15/24 |
| | | | | 192/12 R |
| 4,552,576 | A * | 11/1985 | Hara et al. | 65/378 |
| 4,704,151 | A * | 11/1987 | Keck | 65/402 |
| 6,386,001 | B1 * | 5/2002 | Shimizu et al. | 65/377 |
| 6,516,636 | B1 * | 2/2003 | Gansicke et al. | 65/379 |
| 6,532,776 | B1 * | 3/2003 | Suzuki et al. | 65/404 |
| 6,938,442 | B1 * | 9/2005 | Schmitt et al. | 65/381 |
| 7,788,951 | B2 * | 9/2010 | Shimada et al. | 65/377 |
| 8,082,759 | B2 * | 12/2011 | Okugawa | 65/407 |
| 2005/0066690 | A1 * | 3/2005 | Yamashita et al. | 65/382 |
| 2005/0252248 | A1 * | 11/2005 | Kornreich et al. | 65/435 |
| 2007/0015651 | A1 * | 1/2007 | Endo | C03B 11/08 |
| | | | | 501/50 |
| 2007/0147748 | A1 * | 6/2007 | Kume | C03B 23/207 |
| | | | | 385/96 |

FOREIGN PATENT DOCUMENTS

| | | | | |
|---|---|---|---|---|
| JP | | 5-78139 | * 3/1993 | C03B 37/012 |
| JP | H05-078139 | A | 3/1993 | |
| JP | 2001-048565 | A | 2/2001 | |
| JP | 2005-104763 | A | 4/2005 | |
| JP | 2005-162518 | A | 6/2005 | |

OTHER PUBLICATIONS

Machine translation of JP 5078139 A. (Mar. 30, 3017) pp. 1-11.*
First Office Action for Chinese Patent Application No. 201210051651.4, issued by the State Intellectual Property Office of the Peoples' Republic of China on Dec. 10, 2013.
Notification of Reasons for Refusal for Japanese Patent Application No. 2011-045214, issued by the Japanese Patent Office on Jun. 27, 2013.

* cited by examiner

Prior Art

FIG. 1

Prior Art

ELONGATING METHOD AND APPARATUS FOR GLASS BASE MATERIAL

The contents of the following Japanese patent application is incorporated herein by reference:
No. 2011-045214 filed on Mar. 2, 2011.

BACKGROUND

1. Technical Field

The present invention relates to a method and an apparatus for elongating a glass base material. In particular, the present invention relates to a method and an apparatus for elongating a glass base material, using which the glass base material is processed in a heating furnace and elongated, thereby producing a glass rod having a desirable diameter.

2. Related Art

Figure 1:
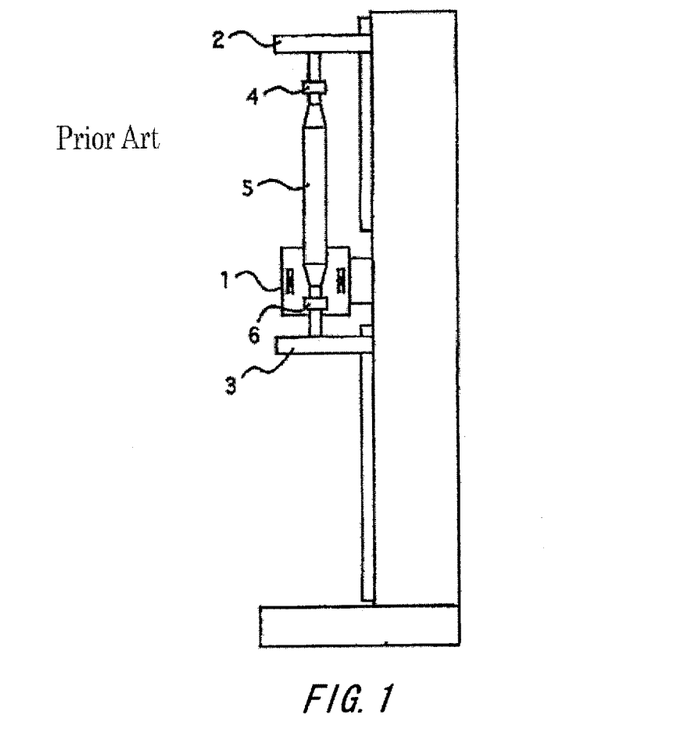
FIG. 1 is a schematic diagram showing a conventional glass base material elongating apparatus.

A quarts glass rod, as represented by an optical fiber preform, is manufactured by elongating a large-scale glass base material having been prepared in advance, in an elongating furnace as shown in FIG. 1 so as to generate a glass rod having a thinner diameter. The elongating furnace consists of three main mechanisms, namely, a heating furnace 1, a feeder 2, and an elongating mechanism 3. The feeder 2 hangs a glass base material 5 via a hanging connector 4, and the lower part of the glass base material 5 is linked to the elongating mechanism 3 via an elongating connector 6. While elongating the glass base material 5, the lowering speed (elongating speed) of the elongating mechanism 3 is faster than the lowering speed (feeding speed) of the feeder 2, thereby narrowing the outer diameter of the glass rod after elongation to be smaller than the outer diameter of the glass base material before the elongation. The feeding speed and the elongating speed are adequately adjusted so as to maintain the outer diameter of the glass rod constant.

Figure 2:
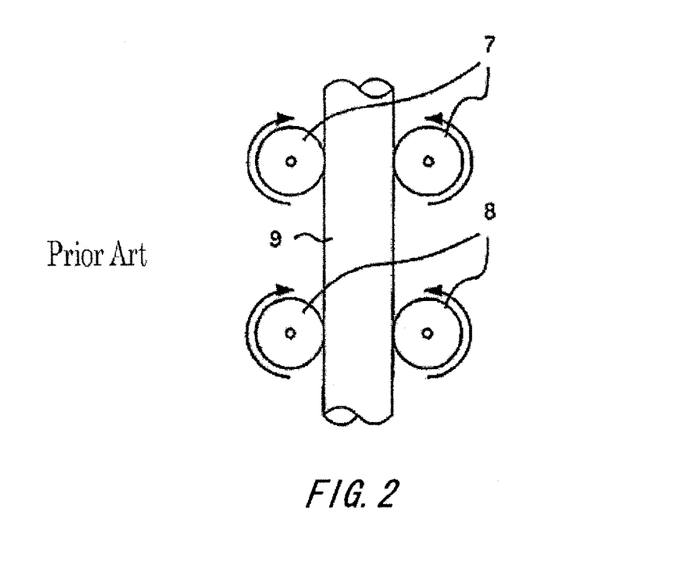
FIG. 2 is a schematic diagram for explaining roller elongation.

There are several types of elongating mechanisms. Besides the chuck type as shown in FIG. 1, which conducts elongation while grasping the lower end of the glass base material 5, there is also a roller type that performs elongation by sandwiching the glass rod 9 elongated by the rolling rollers 7 and 8, an example of which is shown in FIG. 2. In the roller type, the elongating roller can be switched between grasping and releasing so that, when a step portion such as a joint between the dummy rod and the elongated glass rod has reached the roller, the roller can be open to pass that portion. Normally, there are two sets of elongating rollers provided so as to enable elongation while one set of elongating rollers is released.

When elongation is pursued with the chuck type (hereinafter simply "chuck elongation"), the glass rod cannot be elongated longer than the operational stroke of the elongating mechanism. Although being restricted in terms of the length of resulting glass rods, the chuck elongation has an advantage of not scratching the surface of the glass rods, as well as enabling favorable control in elongating speed. When elongation is pursued with the roller type (hereinafter simply "roller elongation"), it can realize an unlimited operational stroke of the elongating mechanism in nature, by a configuration of cutting the lower part of the glass rod lower than the elongating roller to each predetermined length. This makes the roller elongation advantageous especially when creating a long glass rod from a large-size glass base material.

When elongating a large-size glass base material by using roller elongation, the resulting glass rod tends to bend more. There are many possible reasons for this failure, aside from the original bending of the glass base material being a starting material. For example, when a set of elongating rollers are used in elongation, the direction in which the glass rod is elongated becomes unstable, to bend the glass rod. Another case is that when a once bent portion of the glass rod goes through the roller, there will be another bending created at the heated portion.

Figure 3:
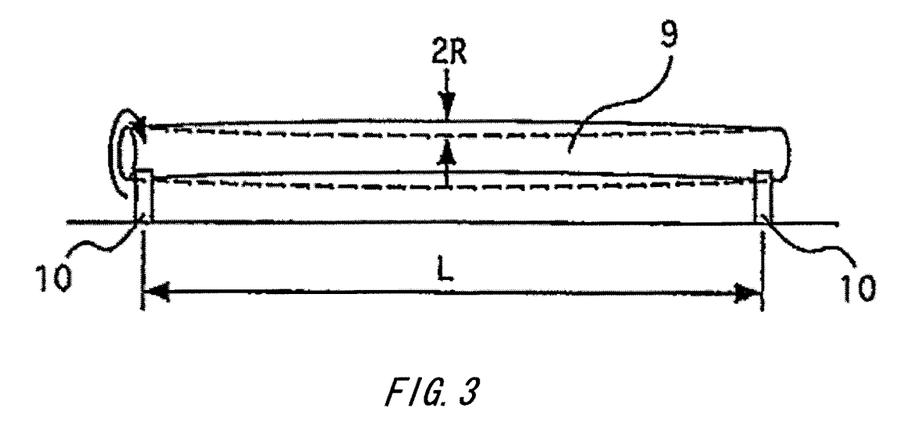
FIG. 3 is a schematic diagram for explaining a measurement method of a bending of a glass rod.

In many cases, the required accuracy in bending of an optical fiber perform, a representative glass rod, is 0.5 mm at largest (e.g. no greater than 0.2 mm) for each 1 m. One solution for alleviating the bending is to adjust the horizontal position on the XY plane of the glass base material hanging section so that the neck down position of the glass base material keeps the target position within the horizontal plane during elongation, as shown in Patent Document 1. Note that the bending can be expressed as R/L (mm/m) when the maximum fluctuation width is expressed as 2R (mm) when the both ends of the glass rod 9 are fixed on the V block 10 having an interval of 1 (m) during the rotation, as shown in FIG. 3.

Patent Document 1: Japanese Patent Application Publication No. 2005-104763

An embodiment example of Patent Document 1 adopts chuck elongation. The chuck elongation, while having an advantage of restraining the bending, is not suited for elongating large-size glass base materials or long glass base materials. On the other hand, while being suited for elongating long glass base material, the roller elongation has such a characteristic that although it can generate a glass rod with sufficiently small bending at the end of elongation, it tends to cause a large bending at the beginning of the elongation, such as no smaller than 2 mm/m and with greater occurrences. As mentioned before, when attempting to obtain a long glass rod from a large-size glass base material, roller elongation is the sole option since the chuck elongation is practically impossible. However, the conventional roller elongation technique is not able to produce products having small bending throughout the elongated glass rod. A product that bends greatly incurs additional cost for correcting the bent portion using a glass lathe.

The present invention attempts to provide a method and an apparatus for elongating a glass base material by roller elongation, using which a glass rod having a small bending is obtained.

SUMMARY

The present invention provides a method of elongating a glass base material to obtain a glass rod having a smaller diameter, using a glass base material elongating apparatus including a feeder at least for the glass base material, a heating furnace, and an elongating mechanism of the glass base material below the heating furnace, the method being characterized in that a horizontal plane position measuring unit of the glass base material is provided inside or near the heating furnace, the feeder is provided with a glass base material horizontal plane position adjusting unit, and the elongating mechanism is equipped with three or more sets of elongating rollers capable of switching between a grasping state and a releasing state for keeping the position of the glass rod in the horizontal plane to be constant, and the glass base material is elongated with the position thereof in the horizontal plane kept as targeted by controlling the glass base material horizontal plane position adjusting unit.

Two or more sets of the three or more sets of elongating rollers of the elongating mechanism may be always kept in the grasping state during elongation. A dummy rod may desirably be fusion-bonded to the glass base material inside the heating furnace of the glass base material elongating apparatus. Bending of the dummy rod connected to the glass base material may be no greater than twice a targeted value of bending for the elongated glass rod.

The present invention also provides an apparatus for elongating a glass base material, which heats the glass base material and elongates the glass base material to obtain a glass rod having a small diameter, the apparatus including: a feeder at least for the glass base material; a heating furnace; and an elongating mechanism of the glass base material below the heating furnace, where a horizontal plane position measuring unit of the glass base material is provided inside or near the heating furnace, the feeder is provided with a glass base material horizontal plane position adjusting unit to align the position of the glass base material in the horizontal plane as targeted during elongation, and the elongating mechanism is equipped with three or more sets of elongating rollers capable of grasping and releasing for keeping the position of the glass rod in the horizontal plane to be constant.

The present invention can align the position of the glass base material during elongation in a horizontal plane, to a predetermined target position, and can easily obtain a glass rod having small bending by performing elongation using three or more sets of elongating rollers.

Therefore, it is an object of an aspect of the innovations herein to provide a method and an apparatus for elongating a glass base material, which are capable of overcoming the above drawbacks accompanying the related art. The above and other objects can be achieved by combinations described in the claims.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

A method and an apparatus for elongating a glass base material according to the present invention are such that a horizontal plane position measuring unit of a glass base material is provided inside or near the heating furnace, the feeder is provided with a glass base material horizontal plane position adjusting unit, and the elongating mechanism is provided with three or more sets of elongating rollers capable of grasping and releasing for keeping constant the position of the glass rod on the horizontal plane, and the glass base material is elongated with the position thereof on the horizontal plane kept as targeted by controlling the glass base material horizontal plane position adjusting unit. By providing the elongating mechanism with the three or more elongating rollers, when the step portion such as the joint between the dummy rod and the glass rod has reached the elongating roller portion, the pair of the elongating rollers will be released to pass that portion, while the other two sets of elongating rollers are keeping the grasping state. According to this configuration, the elongation of the glass rod can be kept in the vertical direction.

It is desirable that the dummy rod be connected to the glass base material by fusion-bonding. It is also desirable that the dummy rod be fusion-bonded to the glass base material in the heating furnace prior to the elongation of the dummy rod. When the dummy rod and the glass base material are connected to each other mechanically using pins or the like, it may be a cause of bending of the glass rod attributed to the slips or backlash of the parts. Any mechanical attempt to eliminate the slip would result in problems such as breakage if heat is imposed, or make the equipment large because of a large interval required for the elongating rollers due to the enlarged parts for the joint. If the dummy rods are fusion-bonded before inserting the glass base material into the heating furnace, it would result in connecting an even longer dummy rod to a large glass base material, which poses a handling issue. This method would also require a large space for enabling insertion into the heating furnace, such as a large building or equipment, and so is economically disadvantageous.

The bending of the dummy rod is preferably no greater than twice as large as the targeted value for the bending of the elongated glass rod. The ground for this value is the fact that the bending is larger in the beginning of the elongation than in the ending of the elongation. Although it is true that if a dummy rod has smaller bending, it can help generate an elongated glass rod with smaller bending, dummy rods with small bending can only be produced with much trouble and high cost. Generally speaking, the size of the bending decreases to half per 1 m at the beginning of the elongation during which the bending is still unstable, although it also depends on how the elongating roller is positioned. In view of this, it is considered sufficient if the bending of the dummy rod is about twice as large as the targeted value of the bending of the glass rod.

Figure 4:
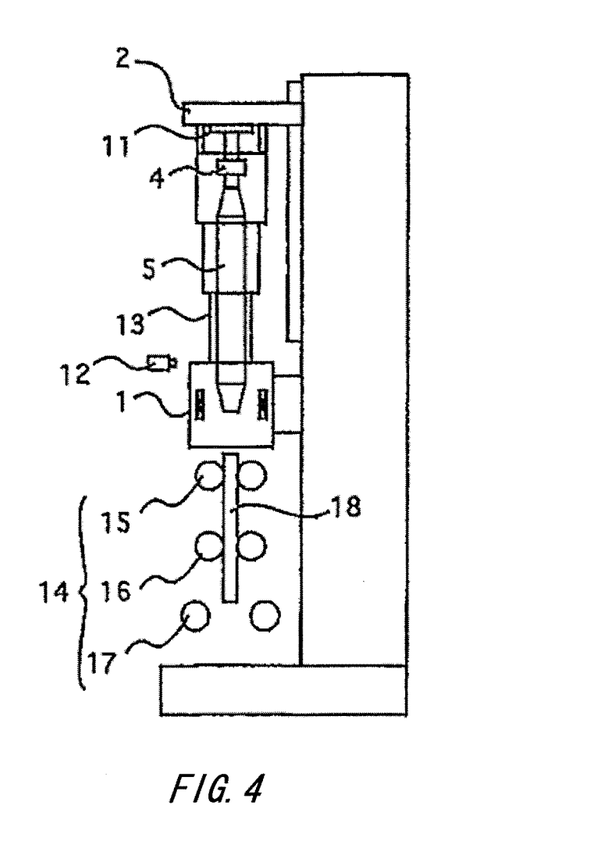
FIG. 4 is a schematic diagram for explaining an example of a glass base material elongating apparatus according to the present invention.

The following details a method according to the present invention with reference to the drawings. As shown in FIG. 4, the glass base material 5 is hung from the feeder 2 via the hanging connector 4, and a horizontal plane position adjusting unit 11 is installed between the hanging connector 4 and the feeder 2. Accordingly, the position of the glass base material 5 in the horizontal plane can be adjusted in the XY direction. An example of this horizontal plane position adjusting unit 11 is an XY table.

A horizontal plane position measuring unit 12 is provided above the heating furnace 1. This enables detection of the position of a glass base material inside the horizontal plane, and adjusting the horizontal plane position adjusting unit 11 to cause to match the position of the glass base material in the horizontal plane to the targeted position. Some examples of the horizontal plane position measuring unit 12 are a combination of a camera and an image processing apparatus, and center position output from laser outer-diameter measuring equipment. The glass base material 5 is surrounded by a top chamber 13 of an expansion and contraction type to prevent wear damage of the inside furnace materials attributed to outside air intrusion into the heating furnace 1.

The elongating mechanism 14 composed of a three sets of elongating rollers 15, 16, and 17 are provided at the lower part of the heating furnace 1. These three sets of elongating rollers are capable of switching between grasping and releasing of a glass rod independently from each other. By always keeping two or more sets of the three sets of the elongating rollers in the grasping state, the glass rod can maintain its vertical orientation during elongation. It is also possible not to provide one set of the elongating rollers 15, 16, and 17 (e.g., the set of elongating rollers 15) with any driving mechanism, but to equip the set with only a function to guide a glass rod to the shaft core.

Not all the rotation shaft cores of the three sets of elongating rollers should necessarily be oriented towards the same direction. The rotating shaft core of at least one set of the elongating rollers may be in a different orientation from those of the other sets of elongating rollers, as long as the glass rod can be grasped or released by the elongating rollers, and the elongation rollers can rotate in the direction in which the glass rod is elongated. By grasping the glass rod from different directions by means of the elongating rollers, the direction of the glass rod can be maintained in the vertical direction during elongation.

To connect the dummy rod 18 to the lower end of the glass base material 5 for elongating purpose, the glass base material 5 is first hung within the heating furnace, and the dummy rod 18 is grasped by the elongating mechanism 14. Then by reversing the elongating roller to raise it in the heating furnace from below, the dummy rod 18 can be heated to be fuse-bonded to the lower end of the heated glass base material 5. During the heating operation for fuse-bonding, the horizontal plane position measuring unit 12 and the horizontal plane position adjusting unit 11 are used to match the position of the glass base material 5 in the horizontal plane to the control target position.

Figure 5A:
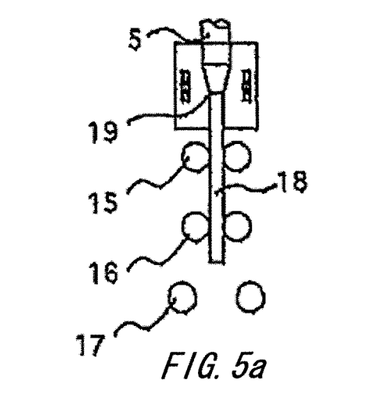
FIG. 5a is a schematic diagram for explaining a grasping operation and a releasing operation of an elongating roller of an elongating mechanism at the beginning of the elongation.

The following explains the elongating roller open/close operation after the fusion-bonding of the dummy rod (grasping and releasing operations) with reference to FIG. 5a-FIG. 5e. FIG. 5a shows the state immediately after fusion-bonding of a dummy rod, from which the elongation starts. First, while the elongating rollers 15 and 16 are driven in the elongating direction to elongate the dummy rod 18, the glass base material 5 is drawn downward to pursue elongation. During elongation, the position of the glass base material 5 in the horizontal plane is adjusted to always be at the control target position.

Figure 5B:
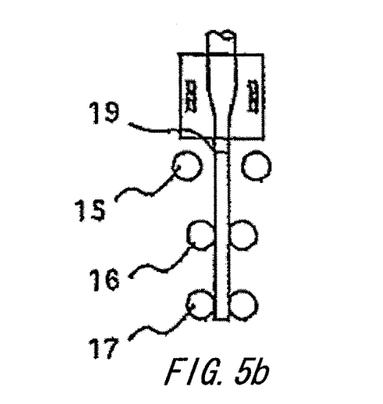
FIG. 5b is a schematic diagram for explaining a grasping operation and a releasing operation of an elongating roller of an elongating mechanism at the beginning of the elongation.
Figure 5C:
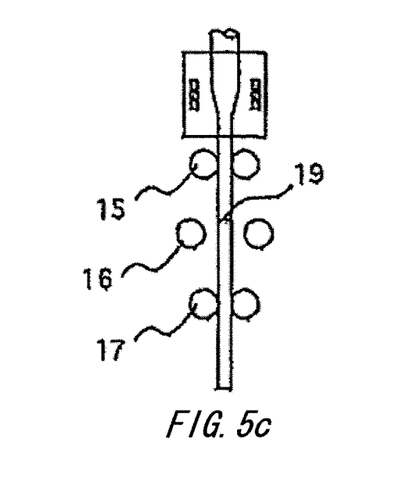
FIG. 5c is a schematic diagram for explaining a grasping operation and a releasing operation of an elongating roller of an elongating mechanism at the beginning of the elongation.
Figure 5D:
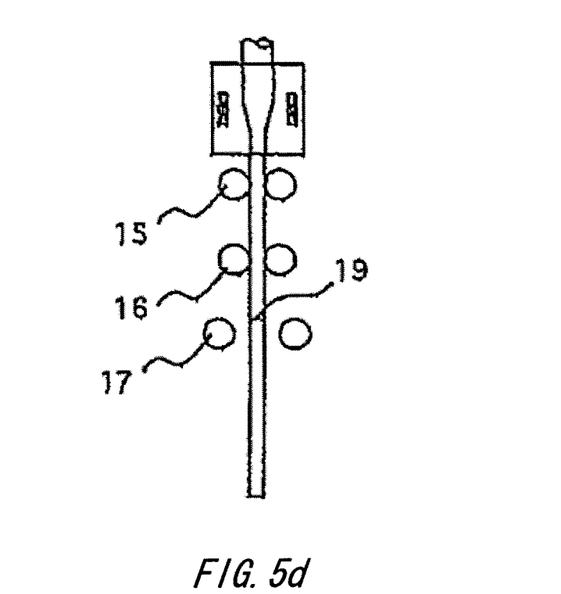
FIG. 5d is a schematic diagram for explaining a grasping operation and a releasing operation of an elongating roller of an elongating mechanism at the beginning of the elongation.

Since there is normally a large step difference or a large diameter fluctuation at the fusion-bonded joint 19 between the glass base material 5 and the dummy rod 18, the elongating roller 15 is released before the fusion-bonded joint 19 reaches the elongating roller 15 as shown in FIG. 5b, while keeping the elongating rollers 15 and 17 in the grasping state. Next, before the fusion-bonded joint 19 reaches the elongating roller 16, the elongating rollers 15 and 17 are brought into the grasping state, and the elongating roller 16 is released, as shown in FIG. 5c. Furthermore, before the fusion-bonded joint 19 reaches the elongating roller 17, the elongating rollers 15 and 16 are brought into the grasping state, and the elongating roller 17 is released, as shown in FIG. 5d.

Figure 5E:
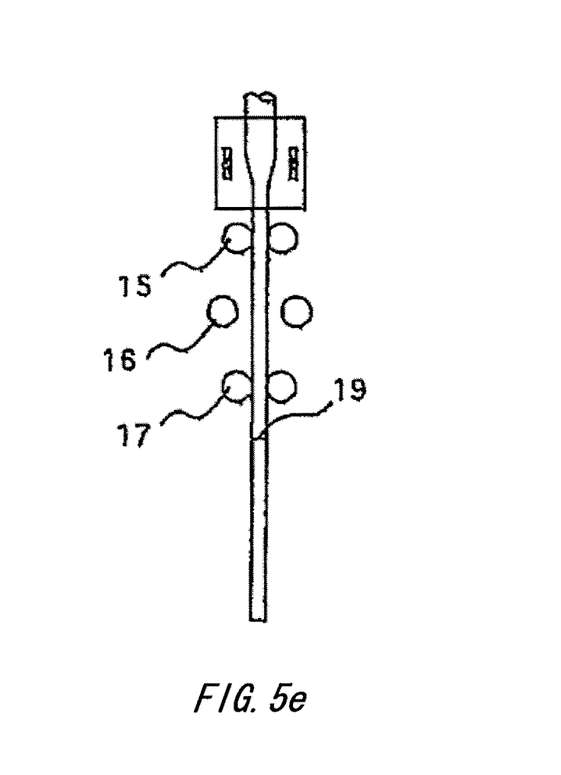
FIG. 5e is a schematic diagram for explaining a grasping operation and a releasing operation of an elongating roller of an elongating mechanism at the beginning of the elongation.

It is possible to continue elongating in this state. However, in view of the fact that the bending accuracy improves as the distance between elongating rollers in the grasping state widens, after the fusion-bonded joint 19 has passed the elongating roller 17, it is desirable to continue elongating while causing the elongating roller 15 and the elongating roller 17 to grasp and releasing the elongating roller 16, as shown in FIG. 5e. In this way, it is preferable to always bring two or more sets of elongating rollers in the grasping state. Note that the portion that has passed the elongating roller 17 is cut at an adequate length.

EMBODIMENT EXAMPLE

Embodiment Example 1

Figure 7:
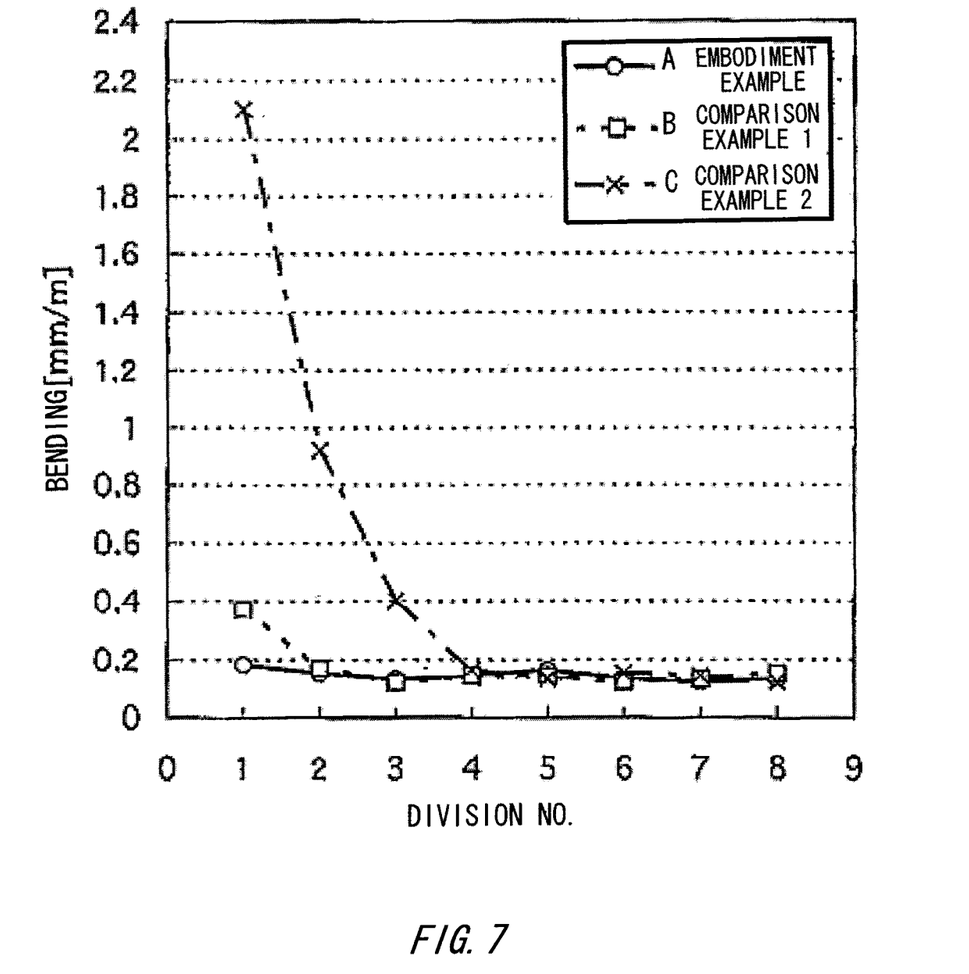
FIG. 7 shows a graph in which bending degrees of glass rods are compared.

Eight glass rods each having a length of 1 m and an outer diameter of 90 mm were obtained by elongating a glass base material having a length of 2000 mm and an outer diameter of 180 mm at its straight tube portion, using the apparatus as shown in FIG. 4, FIG. 5a-FIG. 5e. During elongation, the position of the glass base material in the horizontal plane was controlled as predetermined. The dummy rod used had a bending of 0.40 mm/m. The amount of bending for each divided glass rod is shown by the curve A in FIG. 7, which achieves the target value of no greater than 0.2 mm/m for all the glass rods.

Comparison Example 1

Eight glass rods each having a length of 1 m and an outer diameter of 90 mm were obtained by elongating a glass base material having a length of 2000 mm and an outer diameter of 180 mm at its straight tube portion, using the apparatus as shown in FIG. 4, FIG. 5a-FIG. 5e. During elongation, the position of the glass base material in the horizontal plane was controlled as predetermined. The dummy rod used had a bending of 0.82 mm/m. The amount of bending for each divided glass rod is shown by the curve B in FIG. 7, which shows that the first glass rod divided after the beginning of the elongation could not achieve the target value of no greater than 0.2 mm/m.

Comparison Example 2

Figure 6:
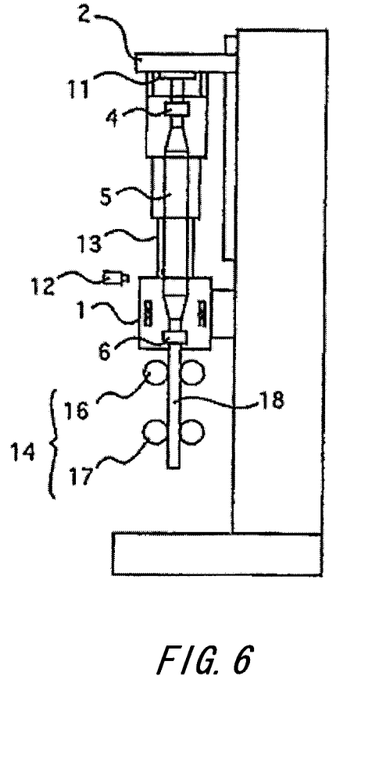
FIG. 6 is a schematic diagram showing a glass base material elongating apparatus used in comparison examples.

Using an apparatus whose elongating mechanism is composed of two sets of elongating rollers shown in FIG. 6, eight glass rods each having a length of 1 m and an outer diameter of 90 mm were obtained by elongating a glass base material having a length of 2000 mm and an outer diameter of 180 mm at its straight tube portion. During elongation, the position of the glass base material in the horizontal plane was controlled as predetermined. The dummy rod and the glass base material were connected mechanically, and slip caused in some degree at the joint. As a result, the amount of bending for each divided glass rod is shown by the curve C in FIG. 7, which shows that the first three glass rods divided after the beginning of the elongation could not achieve the target value of no greater than 0.2 mm/m. The first glass rod divided after the beginning of the elongation had especially large bending which was 2.10 mm/m.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiment(s) of the present invention provide(s) a method and an apparatus for elongating a glass base material, using which the glass base material is processed in a heating furnace and elongated, thereby producing a glass rod having a desirable diameter.

What is claimed is:

1. A method comprising:
   hanging a substantially cylindrical glass base material from a feeder;
   heating the glass base material with a heating furnace arranged below the feeder;
   producing a glass rod having a smaller diameter than the glass base material in a downward direction from the heating furnace;
   as the glass rod is produced in the downward direction from the heating furnace, guiding the glass rod with three or more sets of rollers including a first set of rollers that are all at a first distance from the heating furnace in the downward direction, a second set of rollers that are all at a second distance from the heating furnace in the downward direction, and a third set of rollers that are all at a third distance from the heating furnace in the downward direction, each of the three or more sets of rollers capable of switching between a grasping state in which the set of rollers grasps the glass rod and a releasing state in which the set of rollers does not grasp the glass rod, each of the three or more sets of rollers being in the grasping state for at least a portion of said guiding, said guiding including guiding at least one fusion-bonded joint of the glass rod through each set of rollers;
   detecting a horizontal plane position of the glass base material;
   controlling the horizontal plane position of the glass base material to match a target position;
   before the fusion-bonded joint reaches each set of rollers, switching the reached set of rollers to the releasing state;
   after the fusion-bonded joint has passed each set of rollers, switching the passed set of rollers to the grasping state; and
   after the fusion-bonded joint has passed the third set of rollers and the third set of rollers has switched to the grasping state, switching the second set of rollers to the releasing state, wherein
   the first distance is less than the second distance and the second distance is less than the third distance, and
   one set of the three or more sets of rollers does not have the ability to drive, but only guides the glass rod.

2. The method according to claim 1, wherein, at all times during said guiding, two or more sets of the three or more sets of rollers are in the grasping state.

3. The method according to claim 1, further comprising fusion-bonding a dummy rod to an end of the glass base material.

4. The method according to claim 3, wherein bending of the dummy rod connected to the glass base material is no greater than twice a targeted value of bending for the glass rod.

5. A method comprising:
   hanging a substantially cylindrical glass base material from a feeder;
   heating the glass base material with a heating furnace arranged below the feeder;
   producing a glass rod having a smaller diameter than the glass base material in a downward direction from the heating furnace;
   as the glass rod is produced in the downward direction from the heating furnace, guiding the glass rod with three or more sets of rollers including a first set of rollers that are all at a first distance from the heating furnace in the downward direction, a second set of rollers that are all at a second distance from the heating furnace in the downward direction, and a third set of rollers that are all at a third distance from the heating furnace in the downward direction, each of the three or more sets of rollers capable of switching between a grasping state in which the set of rollers grasps the glass rod and a releasing state in which the set of rollers does not grasp the glass rod, each of the three or more sets of rollers being in the grasping state for at least a portion of said guiding, said guiding including guiding at least one fusion-bonded joint of the glass rod through each set of rollers;
   detecting a horizontal plane position of the glass base material;
   controlling the horizontal plane position of the glass base material to match a target position;
   before the fusion-bonded joint reaches each set of rollers, switching the reached set of rollers to the releasing state;
   after the fusion-bonded joint has passed each set of rollers, switching the passed set of rollers to the grasping state; and
   after the fusion-bonded joint has passed the third set of rollers and the third set of rollers has switched to the grasping state, switching the second set of rollers to the releasing state, wherein
   the first distance is less than the second distance and the second distance is less than the third distance, and
   one of the three or more sets of rollers does not have the ability to drive the glass rod.

6. A method comprising:

hanging a substantially cylindrical glass base material from a feeder;

heating the glass base material with a heating furnace arranged below the feeder;

producing a glass rod having a smaller diameter than the glass base material in a downward direction from the heating furnace;

as the glass rod is produced in the downward direction from the heating furnace, guiding the glass rod with three or more sets of rollers including a first set of rollers that are all at a first distance from the heating furnace in the downward direction, a second set of rollers that are all at a second distance from the heating furnace in the downward direction, and a third set of rollers that are all at a third distance from the heating furnace in the downward direction, each of the three or more sets of rollers capable of switching between a grasping state in which the set of rollers grasps the glass rod and a releasing state in which the set of rollers does not grasp the glass rod, each of the three or more sets of rollers being in the grasping state for at least a portion of said guiding, said guiding including guiding at least one fusion-bonded joint of the glass rod through each set of rollers;

detecting a horizontal plane position of the glass base material;

controlling the horizontal plane position of the glass base material to match a target position;

before the fusion-bonded joint reaches each set of rollers, switching the reached set of rollers to the releasing state;

after the fusion-bonded joint has passed each set of rollers, switching the passed set of rollers to the grasping state; and after the fusion-bonded joint has passed the third set of rollers and the third set of rollers has switched to the grasping state, switching the second set of rollers to the releasing state, wherein the first distance is less than the second distance and the second distance is less than the third distance, and no driving mechanism is provided for one of the three or more sets of rollers.

\* \* \* \* \*